United States Patent [19]
Better et al.

[11] 3,720,116
[45] March 13, 1973

[54] ARRANGEMENT FOR PRELOADING BALL SCREW ASSEMBLIES & METHOD OF MANUFACTURE OF THE BALL SCREW NUT THEREFOR

[75] Inventors: Bernard R. Better, Chicago; Joseph W. Kosinski, Riverside; Edward Hain, Chicago, all of Ill.

[73] Assignee: The Bendix Corporation

[22] Filed: March 23, 1971

[21] Appl. No.: 127,212

[52] U.S. Cl. .................................. 74/459, 74/409
[51] Int. Cl. ......................... F16h 55/22, F16h 55/18
[58] Field of Search ..74/441, 459, 424.8 A, 424.8 R, 74/409, 89.15

[56] References Cited

UNITED STATES PATENTS

| | | | |
|---|---|---|---|
| 2,643,845 | 6/1953 | Baker | 74/441 X |
| 2,749,812 | 6/1956 | Wetzel | 74/441 X |
| 2,567,483 | 9/1951 | Hotine | 74/441 X |
| 3,023,797 | 3/1962 | Greene | 74/441 UX R |

Primary Examiner—Leonard H. Gerin
Attorney—John R. Benefiel and Plante, Hartz, Smith & Thompson

[57] ABSTRACT

A method and arrangement for preloading ball screw assemblies in which a ball screw nut having an axially and resiliently deformable intermediate section integral therewith is utilized which is rigid in torsion and shear, with an arrangement for axially spreading the nut portions connected by the deformable section and securely positioning the portions in their separated position by means of variable width spacers to thereby vary the preload. The method of preloading includes the step of deforming an intermediate portion of the nut so as to cause axial separation of the connected portions thereof and securing the portions in their separate position to create the nut preload. The method of manufacture consists of first machining the screw thread, and other geometry into the nut blank, and then machining an intermediate section so as to render the section axially deformable to provide accurately matched nut portions which are relatively movable axially, but securely located with respect to each other radially and angularly.

13 Claims, 6 Drawing Figures

INVENTORS
BERNARD R. BETTER
JOSEPH W. KOSINSKI
EDWARD HAIN

BY John R Benefiel
ATTORNEY

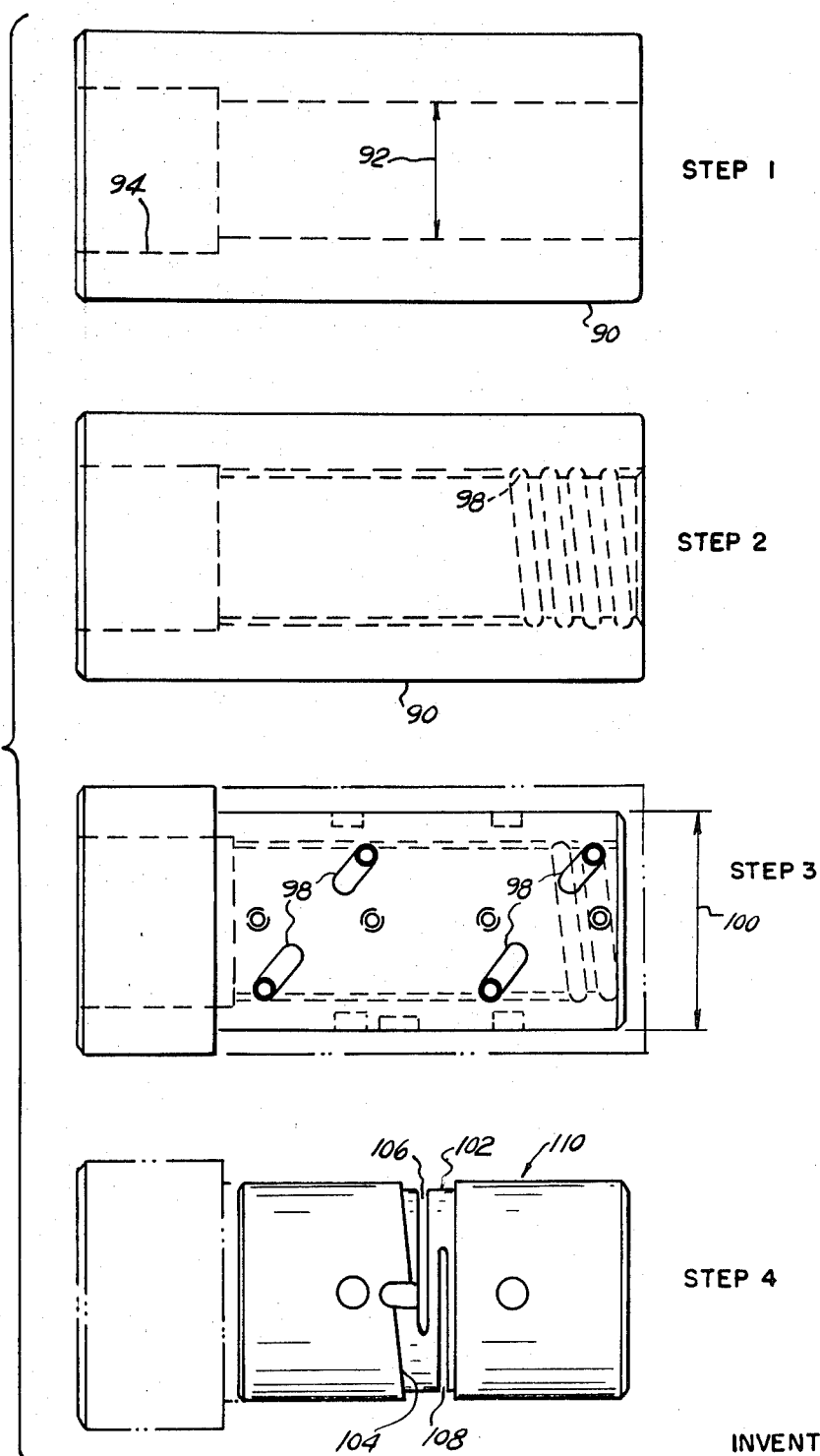

ARRANGEMENT FOR PRELOADING BALL SCREW ASSEMBLIES & METHOD OF MANUFACTURE OF THE BALL SCREW NUT THEREFOR

BACKGROUND OF THE INVENTION

1. Field of the Invention

This invention is concerned with ball screw assemblies, a method of preloading ball screw assemblies, and a method of manufacturing the nut member for use in these assemblies.

2. Description of the Prior Art

Ball screw assemblies are in widespread use in precision applications, such as in positioning devices for numerically controlled machine tools in which backlash must be at an absolute minimum in either direction of travel, and in which the axial spring rate should be as stiff as practicable.

The most common way of obtaining these results is by "preloading" the nut member, an approach which is very well known in the art. Preloading consists of axially offsetting helical groove turns in the nut member relative each other and the screw threads so that the balls tend to engage opposite groove walls in the respective turns to thus eliminate backlash and stiffen the spring rate of the assembly (since more balls must be deflected at any moment and since the spring rate of the assembly rises sharply over a certain level of loading).

This axial offsetting has been accomplished basically in two ways:

1. Grinding the nut groove form so that the lead of some turns are offset from others to thus cause the balls to ramp up on the offset turns. This approach has the advantage of relatively low cost over other approaches, but inasmuch as it is usually desirable to adjust the preload level for particular applications or to compensate for loss of preload through wear, this approach has the disadvantage of being difficult to service since these devices must be disassembled and different sets of balls installed. For this same reason, the adjusted preload level is not easily controlled with any degree of precision. In addition, control of the contact angle is lost in using this method of adjustment which can in turn lead to reduced efficiency and load capacity.

Furthermore, the forming of the helical groove in two steps is usually required, i.e., the offset turns are formed in two separate forming stages and this renders difficult the matching of the geometry of the two sets of threads so formed which is desirable for maximum smoothness and to minimize differences in forward and reverse drag torques.

2. Use of double nuts which have thread forms axially offset from each other to create the preload. The nuts are usually adjustable axially with respect to each other to thus provide for convenient adjustment of the preload level, but the use of two nuts creates high manufacturing costs since close tolerance machining is necessary in order to match helical groove geometry (as each nut is machined separately) as well as concentricity, squareness of the abutting faces, etc., or else compensating devices must be used. In addition, the nuts must be accurately located by dowelling, etc., during assembly, and the nuts may shift radially with respect to each other under loading.

Thus it is an object of the present invention to provide an arrangement for preloading ball screw assemblies without requiring excessive manufacturing costs, and/or difficulties in servicing, or resulting in detrimental performance.

It is a further object to provide a method of manufacturing a nut for preloaded ball screw assemblies which yields maximum smoothness and uniformity of performance, but does not require close tolerance machining processes.

SUMMARY OF THE INVENTION

These objects and others which will become apparent upon a reading of the following specification and claims is accomplished by providing a single nut ball screw configuration, which nut has an integral intermediate, axially deformable section which is relatively rigid in torsion and shear to maintain the nut portions connected thereby in proper relationship against loads encountered in use, and which assembly includes means for axially spreading and locating the nut portions connected by the deformable section to thereby create and control the preload comprising a reduced section forming a pair of abutments and a spacer member disposed between the pair of abutments.

The method of preloading includes the step of deforming an intermediate portion of the nut so as to cause axial separation of the connecting portions thereof and securing these portions in their separated position so as to in turn create the nut preload upon assembly of the ball screw.

BRIEF DESCRIPTION OF THE DRAWINGS

FIG. 5 is a flow diagram of the steps in the process of manufacturing the preload nut according to the present invention.

DETAILED DESCRIPTION

In the following detailed description, certain specific terminology will be used and a specific embodiment will be described in order to provide a full and complete understanding of the invention, but it is to be understood that the invention is not to be so limited, as many variations are possible without departing from the spirit of the present invention.

Figure 1:
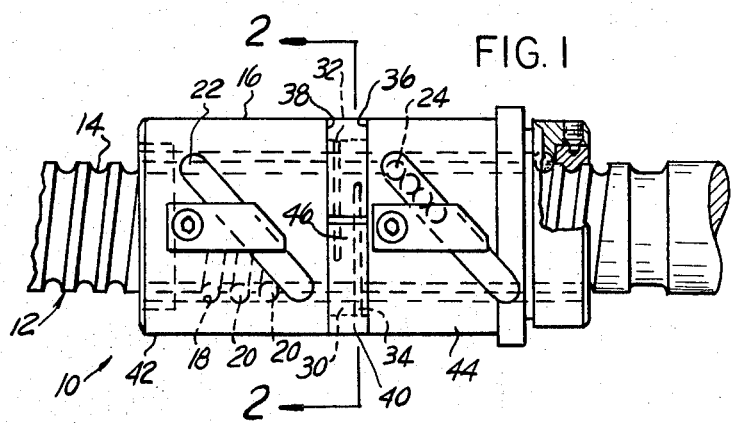
FIG. 1 is a view in partial section of a preloaded ball screw assembly according to the present invention.
Figure 2:
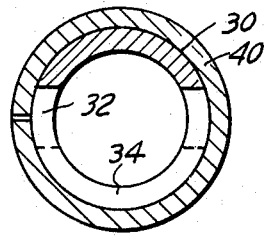
FIG. 2 is a view of the section taken along the line 2—2 in FIG. 1.

Referring to the drawings, and particularly FIGS. 1 and 2, a ball screw assembly 10 is depicted which includes a screw member 12, having an external helical thread groove 14 machined therein, and a nut member 16 formed with a complementary internal screw thread groove 18.

A plurality of recirculating balls 20 are disposed in the passages formed by the complementary grooving 14 and 18 of the screw member 12 and nut member 16, respectively, and are returned for recirculation by a pair of returns 22 and 24, which may be of conventional design, to form a two-circuit system in the manner well known in the art.

Conventional teflon or other wipers 26 and 28 may also be included.

According to the teaching of the present invention, the nut 16 is of integral construction, but has an intermediate reduced portion 30 intermediate the two ball recirculating circuits into which are machined a pair of slots 32 and 34 each extending partially through the reduced portion 30, but directed thereinto from opposite sides of the unit member 16.

Disposed between the shoulders 36 and 38 created by the reduced portion 30 is an annular split spacer 40 which serves to locate the nut portions connected, i.e., the nut halves 42 and 44 on either side of the reduced portion 30.

The slots 32 and 34 render the nut halves 42 and 44 axially movable with respect to each other since bending deflection of the cantilevered section 46 allows substantial movement therebetween. However, inasmuch as deflection in torsional or direct shear of the material left by the partial slots is required to bring about torsional or radial deflection of the nut halves 42 and 44, these halves are securely positioned with respect to each other against such torsional or radial movements, while being allowed to deflect axially fairly readily.

From this description, it should now be apparent that preloading may easily be introduced into the system by axially spreading the nut halves 42 and 44 and inserting an appropriately dimensioned spacer 40, and upon release the nut halves will firmly seat their respective shoulders 38 and 36 thereon.

Upon assembly of the ball screw after deforming the nut halves 42 and 44 the preload will be created.

Since the nut is of integral construction, the groove may be machined into both nut halves in the same operation, assuring extreme uniformity of the groove geometry in both halves, as well as maximum concentricity and continuity therebetween. Furthermore, as noted above the relative rigidity of the intermediate portion 30 against torsion and shear insures that these halves will remain in good radial alignment and will not shift angularly even when loaded in use.

If the preload is lost through wear or an adjustment is desired, it is a simple matter to remove the spacer 40 and replace it with another of a differing width to thereby adjust the preload level without requiring complete diassembly of the unit as is required in the prior art single nut devices described infra.

Figure 3:
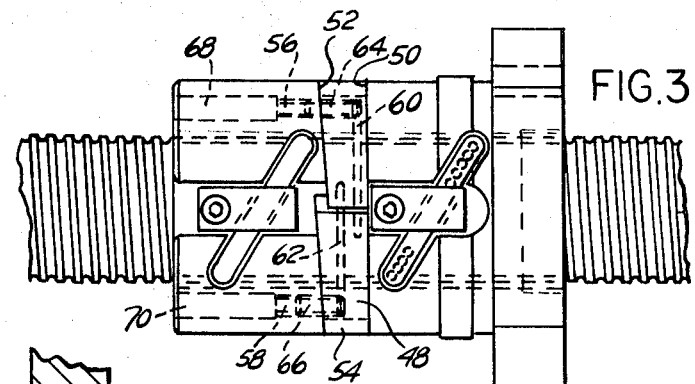
FIG. 3 is an elevational view in partial section of a second embodiment of the preloaded ball screw assembly according to the present invention.

Referring to FIG. 3, another embodiment is depicted utilizing a different spacer arrangement and incorporating therein an arrangement for axially adjusting the nut halves relative each other.

In this embodiment a reduced intermediate portion 48 is also utilized, creating shoulders 50 and 52, but shoulder 52 is contoured to form a spiralling surface rather than the uniform surface of shoulder 38 in the embodiment of FIGS. 1 and 2. Inserted between the shoulders is a split spacer 54 on one side to cooperate with the shoulder 52. Hence, infinite axial adjustment can be accomplished by axially adjusting the spacing of the nut halves by rotating the spacer 54 until it engages both shoulders 50 and 52. Thus, it is not necessary to replace the spacer ring 54 in order to adjust the preload as in the first described embodiment.

This embodiment also incorporates means for accomplishing such axial adjusting of the nut halves relative each other, which means includes a pair of threaded openings 56 and 58 extending axially into one of the nut halves into a respective slot 60 and 62 configured as in the first embodiment. A pair of threaded set screws 64 and 66 are disposed in a respective opening 56 and 58. Enlarged access openings 68 and 70 are provided to allow the set screws 64 and 66 to be rotated by an Allen wrench or screwdriver.

Thus, by advancing the set screws 64 and 66 until they engage the right hand wall of each slot 60 and 62, continued advancement will result in relative axial movement of the right hand nut half with respect to the left. After reaching the desired axial adjustment (and hence preload level) the split ring is advanced into engagement with the shoulders 50 and 52 after which the set screws would be backed off the slot walls.

Although the set screws 64 and 66 themselves could be used to hold the preload adjustment, it is more difficult to maintain an adjustment without unequal movement of the screws or shifting after adjustment than with the split spacer ring 54.

Figure 4:
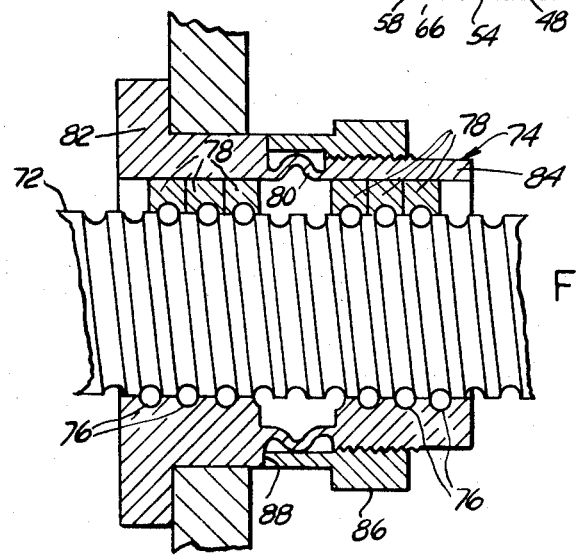
FIG. 4 is an elevational view in partial section of a second embodiment of the preloaded ball screw assembly according to the present invention.

A third embodiment is shown in FIG. 4, in which a different axially deformable section is utilized. As shown in FIG. 4, this embodiment includes a grooved screw member 72 and a corresponding internally grooved nut member 74. A plurality of balls 76 are disposed in the helical passages formed by registry of the screw member 72 and nut member 74, with conventional "insert" type returns 78 utilized to create a six-circuit unit.

An intermediate portion 80 is provided which is machined into a "bellows section" as shown, which may be provided by machining roughly circular arcs as shown. This intermediate portion 80 is also axially and resiliently deformable while being relatively rigid in torsion, but is not as readily deformed axially nor as easy to fabricate as the slotted section embodiments described supra, and for these reasons these latter embodiments are to be preferred.

In order to create the axial separation of the two nut halves 82 and 84, a threaded sleeve 86 is provided, threadedly engaging nut half 84 and abutting a shoulder 88 formed on the other nut half 82. Advancement of the threaded sleeve 86 on the nut half 84 thus will cause axial separation of the two nuts to increase the preload.

In all of the above embodiments, it should be clear that the relative ease of axially separating the nut halves, that is, the relative resiliency of the intermediate deformable section may be controlled by varying the thickness and the length of the sections placed in bending by axial loads, i.e., the portion 46 in the slotted arrangement and the arched section of the "bellows" embodiment.

The proper degree of such resiliency is that which will allow spreading of the nut halves with relative ease while maintaining the nut halves securely aligned. Other considerations are the ease of manufacture and the particular ball-screw envelope configuration required to suit a specific application.

Figure 6:
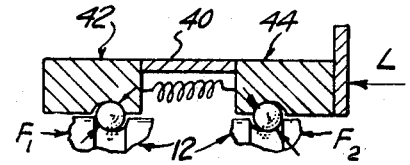
FIG. 6 is a diagrammatic representation of the load transmission paths through the ball screw assembly depicted in FIG. 1.

The resiliency of the center section does not affect the spring rate of the assembly as a whole as can readily be appreciated by an examination of FIG. 6, which depicts the loading of the ball screw assembly of FIG. 1. If the force $F_1$ is applied from the right to the left as viewed therein, it can be seen that the balls in the right hand nut half 44 will transmit the force $F_1$ to the load L. If the force $F_2$ is applied from the left to the right, the balls in the left hand nut 42 will transmit the force to the load L through spacer 40 to the right hand nut 44.

Furthermore, the spacer 40 also absorbs the axial preload force required to maintain the nut halves 42 and 44 in their separated positions.

Hence, since the resilient section as depicted in FIG. 6 is loaded in parallel with the spacer 40, and as it is relatively "soft" as compared with the spacer 40, it affects only negligibly the overall spring rate of the ball screw assembly. In the embodiment of FIG. 3, the center section 80 is relatively stiffer and hence may affect slightly this overall spring rate, but this is of no moment as this resultant spring rate would still be well above that required.

In typical designs, slot widths on the order of a sixteenth of an inch, spaced on the order of three sixteenths of an inch have provided satisfactory stiffness for 1 inch pitch diameter steel ball screw units. Similarly, a bellows section one-eighth inch thick on a one-eighth radius for a 5 inch pitch diameter has been calculated to provide a satisfactory degree of resiliency.

Referring to FIG. 5, the steps in manufacturing a ball screw nut according to the present invention is depicted.

These steps include forming a nut blank 90 with an internal bore 92 the size of the minor diameter of the internal helical thread groove to be formed, with an enlarged bore 94 also included to accommodate holding or chucking tools for subsequent machining operations.

In step II, the internal helical thread groove 96 is machined into the bore throughout the length of the blank 90.

In step III, the rest of the nut geometry such as the ball return openings 98, the final O.D., mounting bolt holes, etc., are machined into the nut blank 90.

In step IV, the reduced intermediate portion 102 is turned shown with one shoulder 104 spiralled, and the slots 106 and 108 are then sawed, extending into the nut 110 from opposite directions from approximately two thirds of the nut diameter, after which the nut 110 is completed by being cut to length.

The machining of the nut geometry, particularly the helical groove 96, prior to formation of the deformable intermediate section insures accurate registry of each nut half geometry with each other without the need for close tolerance machining or special machining techniques, since any tendency of the nut halves to shift axially or bend relative each other due to the existence of deformable intermediate section is thus avoided.

Many alternate configurations and methods of the disclosed embodiments and processes are of course possible within the framework of the present invention, such as series of slots in center section rather than just a pair, or other configurations of deformable center sections, other means and arrangements for axially positioning or spreading the nut halves, alternate machining processes, etc. For example, instead of the spacer rings cooperating with shoulders on a section of reduced nut O.D., raised protuberances could be used. Similarly, this concept is not limited to the specific ball screw configurations disclosed but could be applied to any of the great variety of ball screw configurations and installations, with the many alternate ball returns and refinements now known to those skilled in the art.

What is claimed is:

1. A method of preloading a ball screw assembly having a screw member, a nut member and a plurality of recirculating balls comprising the step of deforming an intermediate section of said nut so as to cause a relative axial shift in position of the nut portions connected thereby sufficient to preload said balls in said ball screw assembly, said step being carried out prior to assembly of said ball screw, whereby said preload is accomplished at assembly by the introduction of said plurality of recirculating balls.

2. A preloaded ball screw assembly comprising:
    a screw member having an external helical groove formed therein;
    a nut member having an internal helical groove formed on an interior bore thereof, said nut member being disposed surrounding said screw member with said grooves in registry;
    means drivingly connecting said nut and screw member including a plurality of balls disposed in said grooves and also including means for recirculating said balls;
    said nut member having an integral intermediate section resiliently deformable so as to cause the nut portions connected thereby to shift axially relative each other, said intermediate portion being rigid in torsion and shear relative to said deformability in said axial direction, whereby said ball screw assembly may be preloaded by deforming said intermediate section, but is capable of carrying torsional and shear loads imposed during use of said ball screw to locate said nut portions radially and angularly with respect to each other.

3. The assembly of claim 2 wherein said intermediate section includes a pair of slots extending partially into said nut member from different directions.

4. The assembly of claim 3 wherein said slots extend inwardly from opposite sides of said nut member.

5. The assembly of claim 3, further including adjustment means carried by said nut member for axially shifting said nut portions relative each other, including at least one element movable to abut at least one slot wall and adjustably located with respect to and carried by the nut portion opposite said slot wall.

6. The assembly of claim 2 wherein said intermediate section comprises an arced section extending about the periphery of said nut member.

7. The assembly of claim 2 wherein said assembly further includes means for locating said nut portions in said axially shifted position, and wherein said means for locating said nut portion includes an abutment on each nut portion formed by a reduced outside diameter section formed on said nut member and also includes a spacer member disposed between said abutments.

8. The assembly of claim 7 wherein at least one of said abutments is spiralled about the nut axis and said spacer member has at least one spiralled edge complementary to said spiralled abutment whereby said nut portions may be adjustably positioned in said axially shifted positions.

9. The assembly of claim 2 further including adjustment means carried by said nut member for axially shifting said nut portions relative each other by deformation of said intermediate section.

10. The assembly of claim 9 wherein said adjustment means includes at least one element movable to axially abut one of said nut portions and adjustably located with respect to and carried by the other of said nut portions.

11. An arrangement for axially adjusting two aligned helically grooved portions of a nut member comprising: said nut member having an integral intermediate section deformable so as to cause the connected nut portions to shift axially relative each other comprising an arced section extending about the periphery of said nut member, whereby said nut portions may be adjusted by deforming said intermediate arced section.

12. An arrangement for axially adjusting two aligned helically grooved portions of a nut member comprising: said nut member having an integral intermediate section deformable so as to cause the connected nut portions to shift axially relative each other, wherein said intermediate section is resiliently deformable and wherein said arrangement further includes means for locating said nut portions in said axially shifted position, and wherein said means for locating said nut portions includes abutments on each nut portion and also includes a spacer member disposed between said abutments, and wherein at least one of said abutments is spiralled about the nut axis and said spacer member has at least one spiralled edge complementary to said spiralled abutment whereby said nut portions may be adjustably positioned in said axially shifted positions.

13. An arrangement for axially adjusting two aligned helically grooved portions of a nut member comprising: said nut member having an integral intermediate section deformable so as to cause the connected nut portions to shift axially relative each other, wherein said intermediate section is resiliently deformable and wherein said arrangement further includes means for locating said nut portions in said axially shifted position, and wherein said intermediate section includes a pair of slots extending partially into said nut member from different directions, and further including adjustment means carried by said nut member for axially shifting said nut portions relative each other, including at least one element movable to abut at least one slot wall and adjustably located with respect to and carried by the nut portion opposite said slot wall.

* * * * *